US012472805B2

(12) United States Patent
Matsuura et al.

(10) Patent No.: US 12,472,805 B2
(45) Date of Patent: Nov. 18, 2025

(54) GLASS RUN FOR AUTOMOTIVE DOOR

(71) Applicant: Nishikawa Rubber Co., Ltd., Hiroshima (JP)

(72) Inventors: Toshifumi Matsuura, Hiroshima (JP); Shingo Tomoyasu, Hiroshima (JP); Tomonori Miyata, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 18/822,219

(22) Filed: Sep. 1, 2024

(65) Prior Publication Data
US 2025/0083507 A1    Mar. 13, 2025

(30) Foreign Application Priority Data

Sep. 11, 2023 (JP) ................................ 2023-147090

(51) Int. Cl.
| | |
|---|---|
| *B60J 10/265* | (2016.01) |
| *B60J 10/00* | (2016.01) |
| *B60J 10/15* | (2016.01) |
| *B60J 10/21* | (2016.01) |
| *B60J 10/32* | (2016.01) |
| *B60J 10/76* | (2016.01) |
| *B29C 48/12* | (2019.01) |

(Continued)

(52) U.S. Cl.
CPC ............ *B60J 10/265* (2016.02); *B60J 10/15* (2016.02); *B60J 10/21* (2016.02); *B60J 10/32* (2016.02); *B60J 10/45* (2016.02); *B60J 10/76* (2016.02); *B29C 48/12* (2019.02); *B29C 48/21* (2019.02); *B29L 2031/302* (2013.01)

(58) Field of Classification Search
None
See application file for complete search history.

(56) References Cited

U.S. PATENT DOCUMENTS

| | | | |
|---|---|---|---|
| 5,743,047 A * | 4/1998 | Bonne ..................... | B60J 10/88 49/495.1 |
| 6,409,251 B1 * | 6/2002 | Kaye ...................... | B60J 10/265 49/495.1 |

(Continued)

FOREIGN PATENT DOCUMENTS

| | | | | |
|---|---|---|---|---|
| CA | 3034784 A1 * | 3/2018 | ............. | B60J 10/27 |
| DE | 102015009919 A1 * | 2/2016 | ............. | B60J 10/25 |

(Continued)

*Primary Examiner* — Catherine A Kelly
(74) *Attorney, Agent, or Firm* — Renner, Otto, Boisselle & Sklar, LLP

(57) ABSTRACT

A glass run for an automotive door, the glass run to be assembled to a window frame of the automotive door from vehicle outside and seal a gap between the window frame and window glass, includes: a glass run body having an insertion groove and attached to a glass run attachment plate extending from an upper portion of the window frame toward the vehicle outside; and a trim strip to be assembled to a side of the glass run body closer to the vehicle outside, the trim strip extending in a vehicle front-rear direction. The trim strip includes a trim strip body made of resin and formed through extrusion molding, and a decorative tape coextruded on a side of the trim strip body closer to the vehicle outside.

4 Claims, 5 Drawing Sheets

(51) Int. Cl.
*B29C 48/21* (2019.01)
*B29L 31/30* (2006.01)

(56) References Cited

U.S. PATENT DOCUMENTS

| | | | |
|---|---|---|---|
| 6,679,003 B2 * | 1/2004 | Nozaki | B60J 5/0402 |
| | | | 49/495.1 |
| 7,478,863 B2 * | 1/2009 | Krause | B60J 10/79 |
| | | | 49/490.1 |
| 8,205,389 B1 * | 6/2012 | Kesh | B60J 10/88 |
| | | | 49/440 |
| 9,027,284 B2 * | 5/2015 | Murree | B60J 10/32 |
| | | | 49/495.1 |
| 9,091,114 B2 * | 7/2015 | Franzen | B60J 10/265 |
| 9,096,114 B2 * | 8/2015 | Baratin | B60J 10/76 |
| 9,969,250 B2 * | 5/2018 | Takeda | B60R 13/04 |
| 10,150,356 B2 * | 12/2018 | Takahashi | B60J 10/88 |
| 10,661,643 B1 * | 5/2020 | Warren | B60J 10/265 |
| 10,766,433 B2 * | 9/2020 | Tomoyasu | B60J 10/16 |
| 10,967,718 B2 * | 4/2021 | Prodoni | B60J 10/265 |
| 11,241,945 B2 * | 2/2022 | Takeda | B60J 10/76 |
| 12,246,659 B2 * | 3/2025 | Houeix | B60J 10/76 |
| 2010/0011670 A1 * | 1/2010 | O'Sullivan | B60J 10/30 |
| | | | 49/489.1 |
| 2013/0292964 A1 * | 11/2013 | Maass | B60J 5/0402 |
| | | | 49/482.1 |
| 2017/0355254 A1 * | 12/2017 | Lee | B60J 10/265 |
| 2021/0309086 A1 * | 10/2021 | Zimmer | B60J 10/265 |

FOREIGN PATENT DOCUMENTS

| | | | | |
|---|---|---|---|---|
| DE | 102020113445 A1 * | 4/2021 | | F16B 5/12 |
| EP | 2803518 A2 * | 11/2014 | | B60J 10/265 |
| EP | 2944492 A1 * | 11/2015 | | B60J 10/30 |
| FR | 2961454 A1 * | 12/2011 | | B60J 10/265 |
| JP | H02-120026 A | 5/1990 | | |
| JP | H10-318228 A | 12/1998 | | |
| JP | 2006-051906 A | 2/2006 | | |
| JP | 2008-087219 A | 4/2008 | | |
| JP | 2015-101272 A | 6/2015 | | |
| JP | 2019-077440 A | 5/2019 | | |
| JP | 2022-111983 A | 8/2022 | | |
| KR | 20140043618 A * | 4/2014 | | B60J 10/265 |

* cited by examiner

GLASS RUN FOR AUTOMOTIVE DOOR

CROSS-REFERENCE TO RELATED APPLICATION

This application claims priority to Japanese Patent Application No. 2023-147090 filed on Sep. 11, 2023, the entire disclosure of which is incorporated by reference herein.

BACKGROUND

The present disclosure relates to a glass run for an automotive door disposed in a window frame of an automotive door.

There are, as doors on both sides of an automobile, doors with a window frame holding a circumferential edge of a window glass. Each door having such a window frame has a glass run disposed between the window frame and the window glass (see Japanese Unexamined Patent Publication No. 2019-77440 and Japanese Unexamined Patent Publication No. 2022-111983, for example). The glass run of Japanese Unexamined Patent Publication No. 2019-77440 includes a glass run body extending in a vehicle front-rear direction along an upper frame edge of the window frame. On the vehicle-exterior side of the glass run body, a trim strip made of a metal plate such as stainless steel and aluminum is provided. The trim strip is attachable to the glass run body by sliding it in the longitudinal direction of the glass run body from the end on one side of the glass run body.

Further, Japanese Unexamined Patent Publication No. 2019-77440 also discloses that a resin member is integrally attached to the vehicle-interior side of the trim strip, and this trim strip is attachable to the glass run body by sliding it in the longitudinal direction from the end on one side of the glass run body.

The glass run of Japanese Unexamined Patent Publication No. 2022-111983 also includes a glass run body extending in a vehicle front-rear direction along an upper frame edge of the window frame, as in Japanese Unexamined Patent Publication No. 2019-77440. A decorative tape having an adhesive agent or an adhesive layer on a back side of a design layer is provided on the vehicle-exterior side of the glass run body.

SUMMARY

If the trim strip is formed of, for example, a stainless steel plate as in Japanese Unexamined Patent Publication No. 2019-77440, the weight of the trim strip increases and the cost of the trim strip increases, which leads to a problem of an increase in the weight and cost of the glass run for an automotive door.

Further, the structure of Japanese Unexamined Patent Publication No. 2019-77440 in which the resin member and the trim strip are integrally formed causes not only a problem of an increase in weight, but also a problem of an increase in the number of parts, which consequently leads to a further increase in costs, and more time for labor to attach the resin member to the trim strip.

On the other hand, according to the structure of Japanese Unexamined Patent Publication No. 2022-111983 in which the decorative tape is provided on the vehicle-exterior side of the glass run body, the glass run body and the decorative tape are inseparable. Thus, when a defect occurs in shaping the glass run body at a time of extrusion molding of the glass run body having a complex shape that is difficult to form, the glass run is discarded along with the decorative tape, even though the decorative tape itself has no defect, which is uneconomical. Further, when the type of decorative tape needs to be changed, for example, from a metallic type to a black type, it is necessary to produce a glass run having a new decorative tape including the glass run body. However, as mentioned earlier, there is a difficulty in extrusion molding the glass run body. It is thus not desirable to perform extrusion molding of the glass run body every time the type of the decorative tape is changed.

The present disclosure is made in view of the above-described problems, and an object of the present disclosure is to provide a glass run for an automotive door that enables cost reduction.

To achieve the above object, a first aspect of the present disclosure may be premised on a glass run for an automotive door, the glass run to be assembled to a window frame of the automotive door from vehicle outside and seal a gap between the window frame and window glass. The glass run includes: a glass run body to be attached to a glass run attachment plate extending from an upper portion of the window frame toward the vehicle outside; and a trim strip to be assembled to a side of the glass run body closer to the vehicle outside, the trim strip extending in a vehicle front-rear direction. The trim strip includes a trim strip body made of resin and formed through extrusion molding, and a decorative tape coextruded on a side of the trim strip body closer to the vehicle outside.

When the decorative tape according to this configuration has, for example, a metallic finish, it is possible to obtain the trim strip whose vehicle outside has a metallic finish without a stainless steel plate or an aluminum plate. If the trim strip needs to be a black color, it is only necessary for the trim strip, the extrusion molding of which is relatively less difficult, to have the decorative tape whose color has been changed to the black color, and the same glass run body can be used. The resin forming the trim strip body and the decorative tape reduce the weight of the trim strip because the resin forming the trim strip body is lighter in weight than a stainless steel plate or an aluminum plate used as a material for known metal trim strip and because the decorative tape is thinner than the stainless steel plate or the aluminum plate. Further, since the decorative tape is coextruded at the time of extrusion molding of the trim strip body, the trim strip body and the decorative tape are already integrated when the trim strip is manufactured. Thus, the number of parts does not increase.

A second aspect of the present disclosure may be such that the glass run body is curved to be convex upward. In this case, an upper projection and a lower projection, each projecting toward vehicle inside and extending in the vehicle front-rear direction, are formed on an upper end and a lower end of the trim strip body, respectively, and a thickness of the lower projection can be set to be thicker than a thickness of the upper projection.

That is, since the window frame is formed to be convex upward along the shape of the roof of the automobile, the glass run body is also curved to be convex upward. It is thus preferable to also make the trim strip curved to be convex upward in conformity with the shape of the glass run body. According to this configuration, since the lower projection is thicker than the upper projection, the resin of the lower projection contracts more in the process of cooling the resin after extrusion molding. As a result, the trim strip naturally curves to be convex upward.

A third aspect of the present disclosure may be such that an upper portion of the decorative tape extends to reach an upper surface of the upper projection, and a lower portion of the decorative tape extends to reach a lower surface of the lower projection.

According to this configuration, the upper portion of the decorative tape extends to cover part of the upper surface of the upper projection of the trim strip body. This makes the upper end of the decorative tape less visible from the outside and improves the appearance. The same applies to the lower portion of the decorative tape.

A fourth aspect of the present disclosure may be such that an upper ridge projecting upward and extending in the vehicle front-rear direction and a lower ridge projecting downward and extending in the vehicle front-rear direction are formed at a portion of the glass run body where the trim strip body is attached. In this case, an upper fit portion mating with the upper ridge and a lower fit portion mating with the lower ridge are formed on a side of the trim strip body closer to the vehicle inside, and the trim strip is movable in the vehicle front-rear direction relative to the glass run body while the upper fit portion and the lower fit portion mate with the upper ridge and the lower ridge, respectively.

According to this configuration, it is possible to attach the trim strip to the glass run body at a desired position by fitting the upper fit portion and the lower fit portion of the trim strip to the upper ridge and the lower ridge of the glass run body, respectively, from one end in the front-rear direction of each of the upper and lower fit portions, and then moving the trim strip in the vehicle front-rear direction relative to the glass run body. The trim strip can be moved relative to the glass run body in the vehicle front-rear direction with a small force because the trim strip is curved to be convex upward similarly to the glass run body.

A fifth aspect of the present disclosure may be such that a thickness of the upper fit portion and a thickness of the lower fit portion are set to be thinner than a thickness of a portion of the trim strip body where the decorative tape is layered.

According to this configuration, the upper fit portion and the lower fit portion projecting toward the vehicle inside are thin. Thus, the trim strip is easily bent to be in conformity with the shape of the glass run body at the time of assembling the trim strip to the glass run body. As a result, the workability in assembling the trim strip is improved.

A sixth aspect of the present disclosure may be such that the trim strip body is formed through extrusion molding in such a manner that the resin forming the trim strip body does not overlap an upper end and a lower end of a surface of the decorative tape.

According to this configuration, the resin does not overlap the upper end and the lower end of the surface of the decorative tape at the time of coextruding the decorative tape and the trim strip body. The moldability thus improves.

As described above, the trim strip body has a decorative tape that is coextruded on the side closer to the vehicle outside. It is thus possible to provide a glass run for automobile doors that is lightweight, has a small number of parts, and can reduce costs.

DETAILED DESCRIPTION

Embodiments of the present disclosure will now be described in detail with reference to the drawings. The following description of preferred embodiments is merely illustrative in nature and is not intended to limit applications or uses of the present disclosure.

Figure 1:
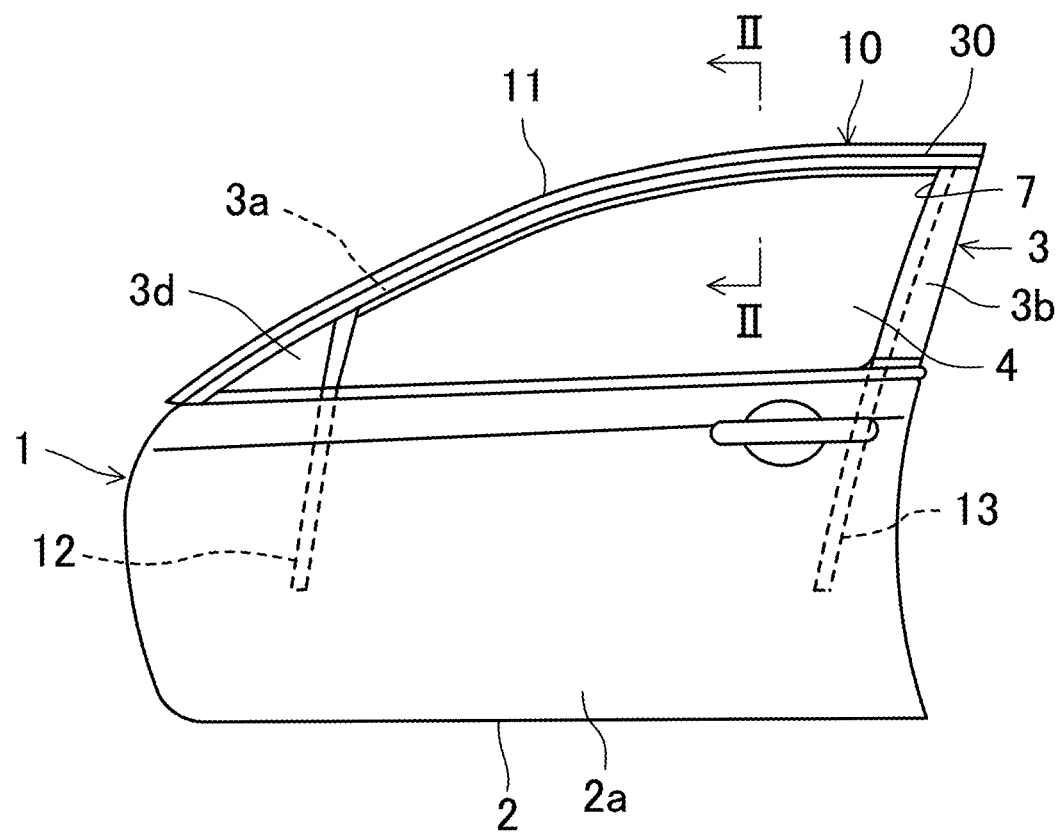
FIG. 1 is a diagram of a left side view of an automotive door to which a glass run for an automotive door according to an embodiment of the present disclosure is assembled.

FIG. 1 is a diagram of a side view of a left front door 1 (automotive door) including a glass run 10 (glass run for an automotive door) for a left front door related to an embodiment of the present disclosure, as viewed from outside of the vehicle (from the left side). The left front door 1 is disposed on the left front side of an automobile (not illustrated), and opens and closes an opening (not illustrated) formed in the left front side of the automobile. A right front door (not illustrated) and the left front door are symmetrically equipped. The glass run for an automotive door according to the present disclosure is mountable on the right and left rear doors (not illustrated) as well.

In the description of this embodiment, a vehicle front side is simply referred to as "front," and a vehicle rear side is simply referred to as "rear." Further, the vehicle outside and vehicle inside of the automobile are as defined in each figure.

(Door Structure)

As illustrated in FIG. 1, the left front door 1 includes a door body 2 that is almost a substantially lower half of the left front door 1 and a window frame 3 that is almost a substantially upper half of the left front door 1. Although not illustrated, a front end of the door body 2 is attached on a pillar of a vehicle body via hinges pivoting about an axis extending in a vertical direction. The door body 2 includes an inner panel (not illustrated) and an outer panel 2a which are made of a steel sheet or any other suitable material, and is configured to house a window glass 4 which is movable up and down, and a lifting apparatus (not illustrated) which allows the window glass 4 to move up and down.

The window frame 3 functions as a sash holding a peripheral portion of the window glass 4, and extends to define a window opening 7. The window glass 4 covers or uncovers the window opening 7 defined by the window frame 3. The window frame 3 of this embodiment is comprised of a combination of an outer panel 5 and an inner panel 6, both of which are press-formed from a steel sheet or any other suitable material, as shown in FIG. 2.

As illustrated in FIG. 1, the window frame 3 includes an upper frame portion 3a and a rear frame portion 3b. The upper frame portion 3a extends rearward from a front part of an upper edge of the door body 2, and is curved to be convex upward. The rear frame portion 3b extends upward from a rear portion of the upper edge of the door body 2. An upper end of the rear frame portion 3b and a rear end of the upper frame portion 3a are connected together to form the window frame 3.

The shape of the window frame 3 is not limited to the illustrated one. Alternatively, the window frame 3 may be generally curved upward, and the position of a curved portion and a curvature and inclination angle of the upper frame portion 3a may be set in conformity with the roof shape of the vehicle body. The window frame 3 may include a front frame (not illustrated) extending vertically in its front part. The window frame 3 also has, in its front part, a door mirror securing portion 3*d* to which a door mirror (not illustrated) is attached. However, the door mirror securing portion 3*d* may be provided as needed.

Figure 2:
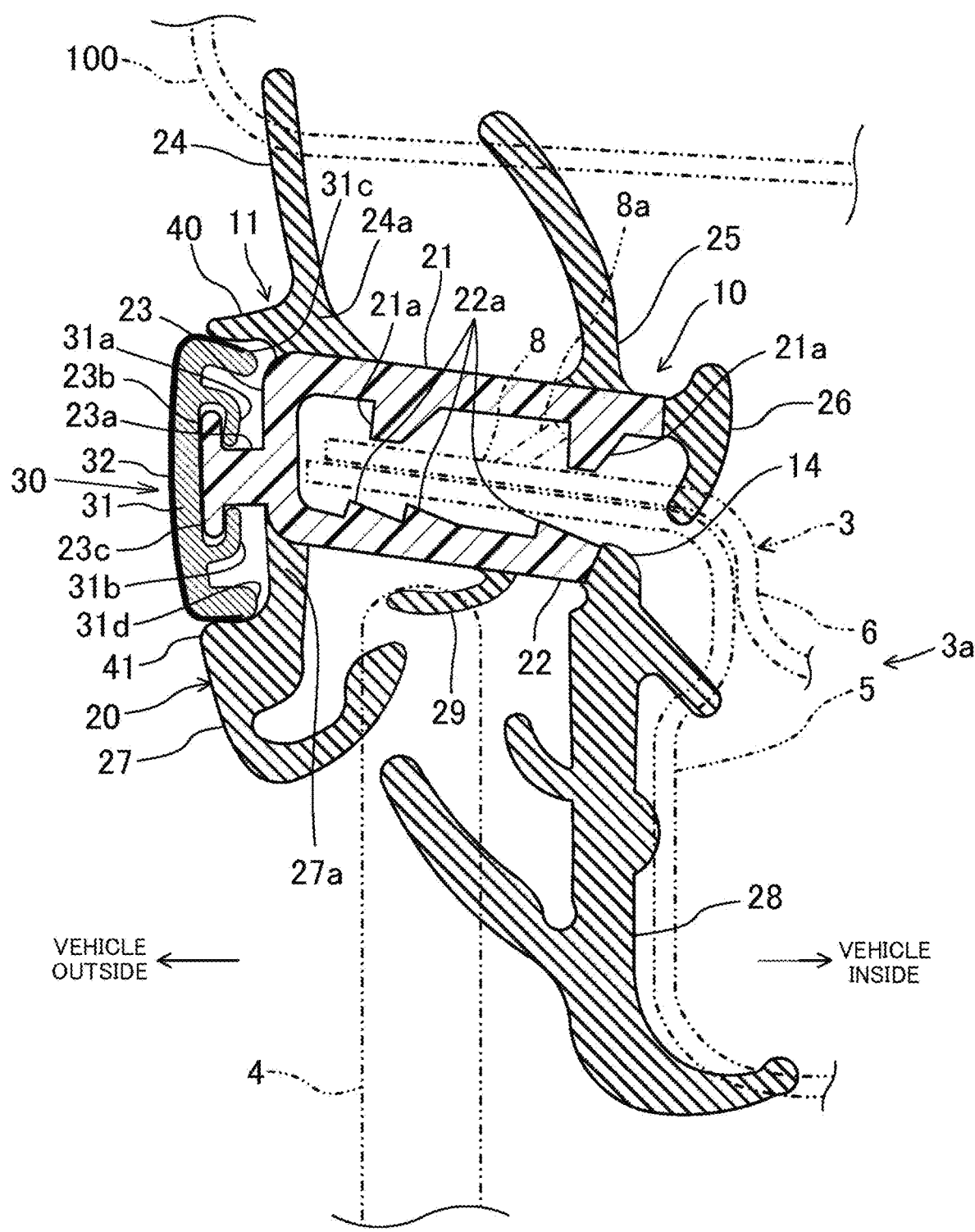
FIG. 2 is a diagram of a cross-sectional view taken along the line II-II in FIG. 1.

As shown in FIG. 2, the upper frame portion 3*a* of the window frame 3 includes a glass run attachment plate 8 protruding toward the vehicle outside. The glass run attachment plate 8 is curved to be convex upward and formed of portions of the outer panel 5 and the inner panel 6 closer to the vehicle outside.

That is to say, the portion of the outer panel 5 closer to the vehicle outside extends substantially horizontally, and extends continuously in the front-rear direction. Likewise, the portion of the inner panel 6 closer to the vehicle outside extends substantially horizontally, and extends continuously in the front-rear direction. The lower surface of the portion of the inner panel 6 closer to the vehicle outside is placed on the upper surface of the portion of the outer panel 5 closer to the vehicle outside to form the glass run attachment plate 8. The glass run attachment plate 8 can be constituted by either one or both of the outer panel 5 and the inner panel 6.

(Structure of Glass Run for Automobile Door)

A left front door glass run 10 is formed to cover at least a portion of the window frame 3 closer to the vehicle outside. As will be described in detail later, the left front door glass run 10 is assembled on the upper frame portion 3*a* of the window frame 3 from the vehicle outside, and functions as a seal which seals a gap between the window frame 3 and the window glass 4. The left front door glass run 10 further covers the glass run attachment plate 8 that is a portion of the window frame 3 closer to the vehicle outside.

As illustrated in FIG. 1, the left front door glass run 10 includes an upper glass run portion 11, a front vertical glass run portion 12, and a rear vertical glass run portion 13. The upper glass run portion 11, the front vertical glass run portion 12, and the rear vertical glass run portion 13 are integrally formed together. The upper glass run portion 11 extends in the front-rear direction along the upper frame portion 3*a* that is the upper part of the window frame 3, and is curved to be convex upward along the upper frame portion 3*a* in the state assembled on the glass run attachment plate 8.

As illustrated in FIG. 2, the left front door glass run 10 includes a glass run body 20 and a trim strip 30. The glass run body 20 has an insertion groove 14 into which the glass run attachment plate 8 is inserted. The trim strip 30 is assembled on the side of the glass run body 20 toward the vehicle outside and extends in the front-rear direction. The trim strip 30 is assembled only on the glass run body 20 forming the upper glass run portion 11 and is not assembled on the front vertical glass run portion 12 and the rear vertical glass run portion 13.

The glass run body 20 includes an upper plate portion 21, a lower plate portion 22, and an outer plate portion 23. The upper plate portion 21 extends along the upper surface of the glass run attachment plate 8. The lower plate portion 22 extends along the lower surface of the glass run attachment plate 8. The outer plate portion 23 vertically extends from the end of the upper plate portion 21 closer to the vehicle outside to the end of the lower plate portion 22 closer to the vehicle outside. The upper plate portion 21, the lower plate portion 22, and the outer plate portion 23 are integrally formed together through extrusion molding.

The insertion groove 14 is formed between the upper plate portion 21 and the lower plate portion 22. The insertion groove 14 has an opening defined by the end of the upper plate portion 21 closer to the vehicle inside and the end of the lower plate portion 22 closer to the vehicle inside, and extends in the front-rear direction. The outer plate portion 23 constitutes a bottom of the insertion groove 14.

The lower surface of the upper plate portion 21 has a plurality of upper engaging projections 21*a* projecting downward and formed at a certain interval in the inward-outward direction of the vehicle. The upper engaging projections 21*a* can be designed to have a lower end in contact with the upper surface of the glass run attachment plate 8. The upper engaging projection 21*a* located closer to the vehicle inside comes into contact with a raised portion 8*a* from the vehicle inside, and engages with the raised portion 8*a*, which projects upward from the upper surface of the glass run attachment plate 8. This structure makes the left front door glass run 10 less likely to be detached from the glass run attachment plate 8. Further, the upper surface of the lower plate portion 22 has a plurality of lower engaging projections 22*a* projecting upward and formed at certain intervals in the inward-outward direction of the vehicle.

The glass run body 20 is provided with an upper sealing lip 24 at an upper portion on the side closer to the vehicle outside. The upper sealing lip 24 projects upward and is designed to be bent toward the vehicle outside, upon contact with the vehicle body 100 of an automobile. A base end of the upper sealing lip 24 is fixed to, and is integrated with, a portion of the upper surface of the upper plate portion 21 closer to the vehicle outside.

The glass run body 20 is provided with an inner sealing lip 25 at an upper portion on the side closer to the vehicle inside. The inner sealing lip 25 projects upward and is designed to be bent toward the vehicle outside, upon contact with the vehicle body 100 of the automobile. A base end of the inner sealing lip 25 is fixed to, and is integrated with, a portion of the upper surface of the upper plate portion 21 closer to the vehicle inside.

An inner sealing portion 26 projecting downward is provided at the end of the upper plate portion 21 closer to the vehicle inside. The inner sealing portion 26 is fixed to, and is integrated with, the end of the upper plate portion 21 closer to the vehicle inside. The lower end of the inner sealing portion 26 is designed to come into contact with the upper surface of the glass run attachment plate 8.

A lower sealing portion 27 projecting downward is provided at a lower portion of the glass run body 20 closer to the vehicle outside. A base end of the lower sealing portion 27 is fixed to, and is integrated with, a portion of the lower surface of the lower plate portion 22 closer to the vehicle outside. A lower portion of the lower sealing portion 27 is bent toward the vehicle inside. The lower portion of the lower sealing portion 27 comes into contact with the outer surface of the window glass 4 when the window glass 4 is closed.

A lower sealing portion 28 projecting downward is provided at a lower portion of the glass run body 20 closer to the vehicle inside. A base end of the lower sealing portion 28 is fixed to, and integrated with, the end surface of the lower plate portion 22 toward the vehicle inside. A lower portion of the lower sealing portion 28 is bent toward the vehicle inside. The lower portion of the lower sealing portion 28 comes into contact with the outer panel 5 of the window frame 3. The lower sealing portion 28 also comes into contact with the inner surface of the window glass 4 when the window glass 4 is closed.

The lower plate portion 22 has, on its lower surface, a middle sealing lip 29 located between the base end of the lower sealing portion 27 and the base end of the lower sealing portion 28. A base end of the middle sealing lip 29 is fixed to, and integrated with, a middle portion of the lower surface of the lower plate portion 22 in the inward-outward direction of the vehicle. The middle sealing lip 29 extends obliquely downward toward the vehicle outside and comes into contact with an upper end of the window glass 4 when the window glass 4 is closed.

Elastic materials may be used as materials forming the upper sealing lip 24, the inner sealing lip 25, the inner sealing portion 26, the lower sealing portion 27, the lower sealing portion 28, and the middle sealing lip 29. The elastic materials are, for example, rubbers containing various polymers as a main component, such as ethylene-propylene-diene rubber (EPDM), and various types of thermoplastic elastomers (TPEs), such as thermoplastic elastomer olefin (TPO) and thermoplastic elastomer styrene (TPS). The rubber or TPE may be a foamed material, or a solid material.

The upper sealing lip 24, the inner sealing lip 25, the inner sealing portion 26, the lower sealing portion 27, the lower sealing portion 28, and the middle sealing lip 29 form the glass run body 20 along with the upper plate portion 21, the lower plate portion 22, and the outer plate portion 23.

The outer plate portion 23 of the glass run body 20 is a portion to which the trim strip body of the trim strip 30 is attached. The surface of the outer plate portion 23 toward the vehicle outside has a projection 23*a* projecting to the vehicle outside and extending in the front-rear direction. An upper ridge 23*b* projecting upward and extending in the front-rear direction and a lower ridge 23*c* projecting downward and extending in the front-rear direction are formed at the tip of the projection 23*a*.

Figure 3:
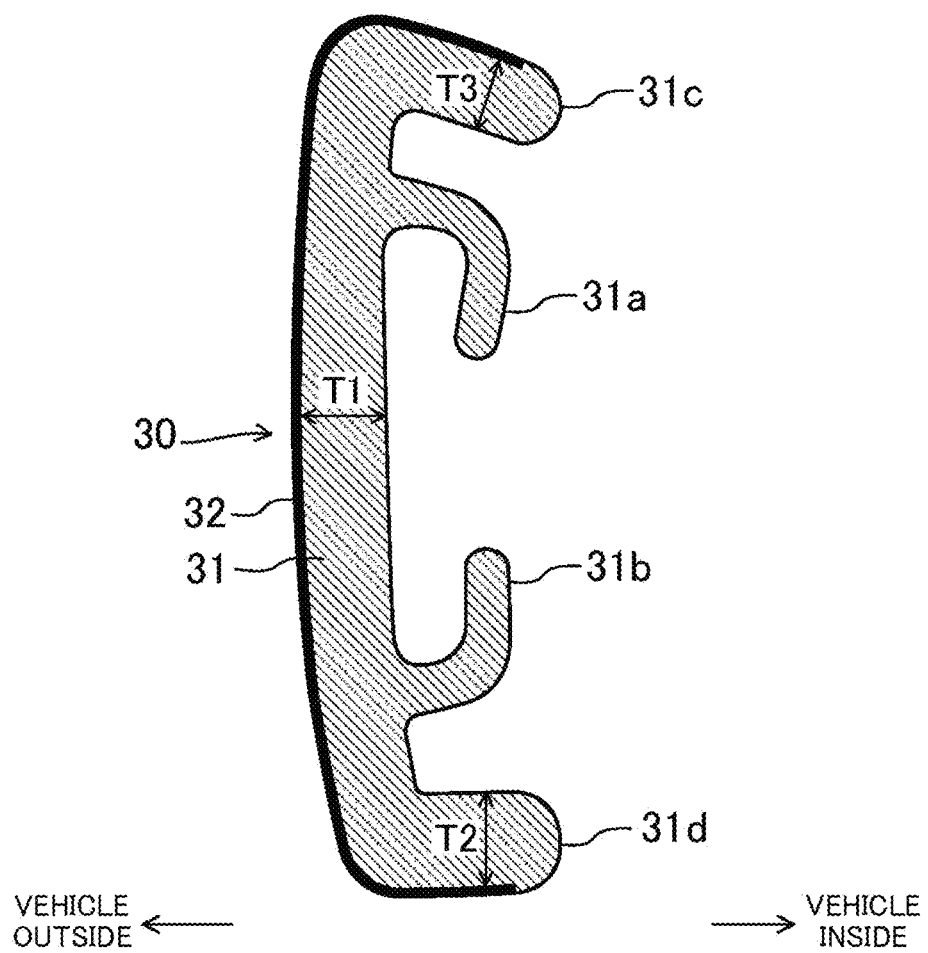
FIG. 3 is a diagram of an enlarged cross-sectional view of a trim strip taken along the line II-II in FIG. 1.

As illustrated in FIG. 1, the trim strip 30 is a member used as part of the vehicle's design. As illustrated in the enlarged cross-sectional view of the trim strip 30 in FIG. 3, the trim strip 30 has a trim strip body 31 made of resin and a decorative tape 32. The trim strip body 31 has a plate-like shape extending in the front-rear direction as well as in the vertical direction. As illustrated in FIG. 2, the upper end of the trim strip body 31 is positioned higher than the upper end of the outer plate portion 23 of the glass run body 20, and the lower end of the trim strip body 31 is positioned lower than the lower end of the outer plate portion 23 of the glass run body 20. The vertical dimension of the trim strip body 31 is longer than the vertical dimension of the outer plate portion 23 of the glass run body 20.

The trim strip body 31 is made of a rigid resin material similar to the resin material forming the upper plate portion 21 and the like of the glass run body 20. The trim strip body 31 is a member formed through extrusion molding by using an extrusion molding machine (not illustrated). Since the trim strip body 31 is formed through extrusion molding, the trim strip body 31 has the same cross-sectional shape from its one end to the other end in the longitudinal direction.

An upper fit portion 31*a* mating with the upper ridge 23*b* of the glass run body 20 and a lower fit portion 31*b* mating with the lower ridge 23*c* are formed on the surface of the trim strip body 31 toward the vehicle inside. The thickness of the upper fit portion 31*a* and the thickness of the lower fit portion 31*b* are set to be thinner than a thickness T1 (shown in FIG. 3) of a portion of the trim strip body 31 where the decorative tape 32 is layered.

The upper fit portion 31*a* projects toward the vehicle inside and then bends downward so as to surround the upper ridge 23*b* from above and from the vehicle inside. The lower fit portion 31*b* projects toward the vehicle inside and then bends upward so as to surround the lower ridge 23*c* from below and from the vehicle inside. The projection 23*a* of the glass run body 20 is positioned between the lower end of the upper fit portion 31*a* and the upper end of the lower fit portion 31*b*. The trim strip 30 is movable in the front-rear direction relative to the glass run body 20 while the upper fit portion 31*a* and the lower fit portion 31*b* mate with the upper ridge 23*b* and the lower ridge 23*c*, respectively.

An upper projection 31*c* and a lower projection 31*d*, each projecting toward the vehicle inside and extending in the front-rear direction, are formed on an upper end and a lower end of the trim strip body 31, respectively. The upper projection 31*c* is inclined downward as it is closer to the vehicle inside. A thickness T2 of the lower projection 31*d* is set to be thicker than a thickness T3 of the upper projection 31*c*. Further, the thickness T2 of the lower projection 31*d* is thicker than the thickness T1 of the portion of the trim strip body 31 extending in the vertical direction.

Figure 4:
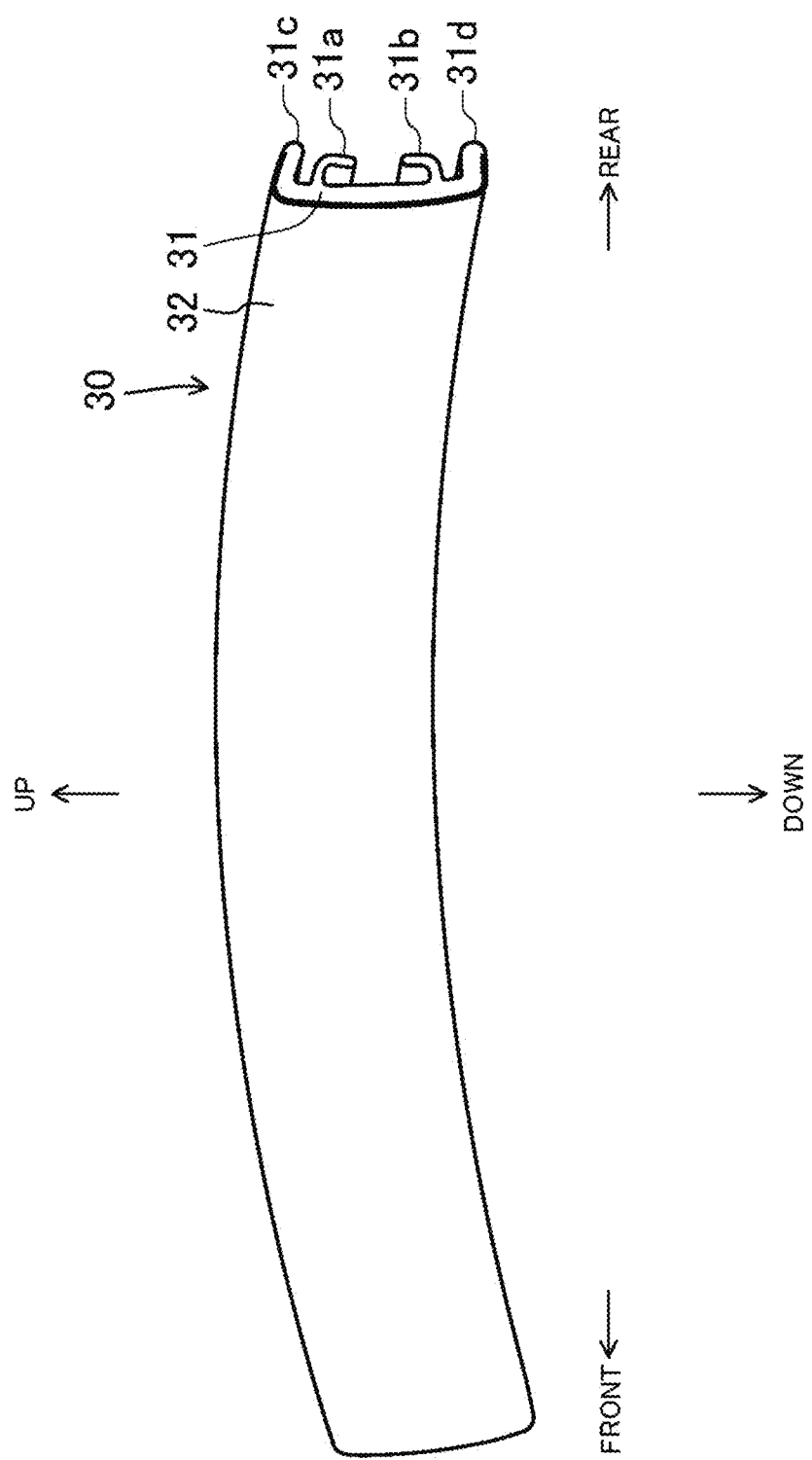
FIG. 4 is a diagram of a side view of the trim strip.
Figure 5:
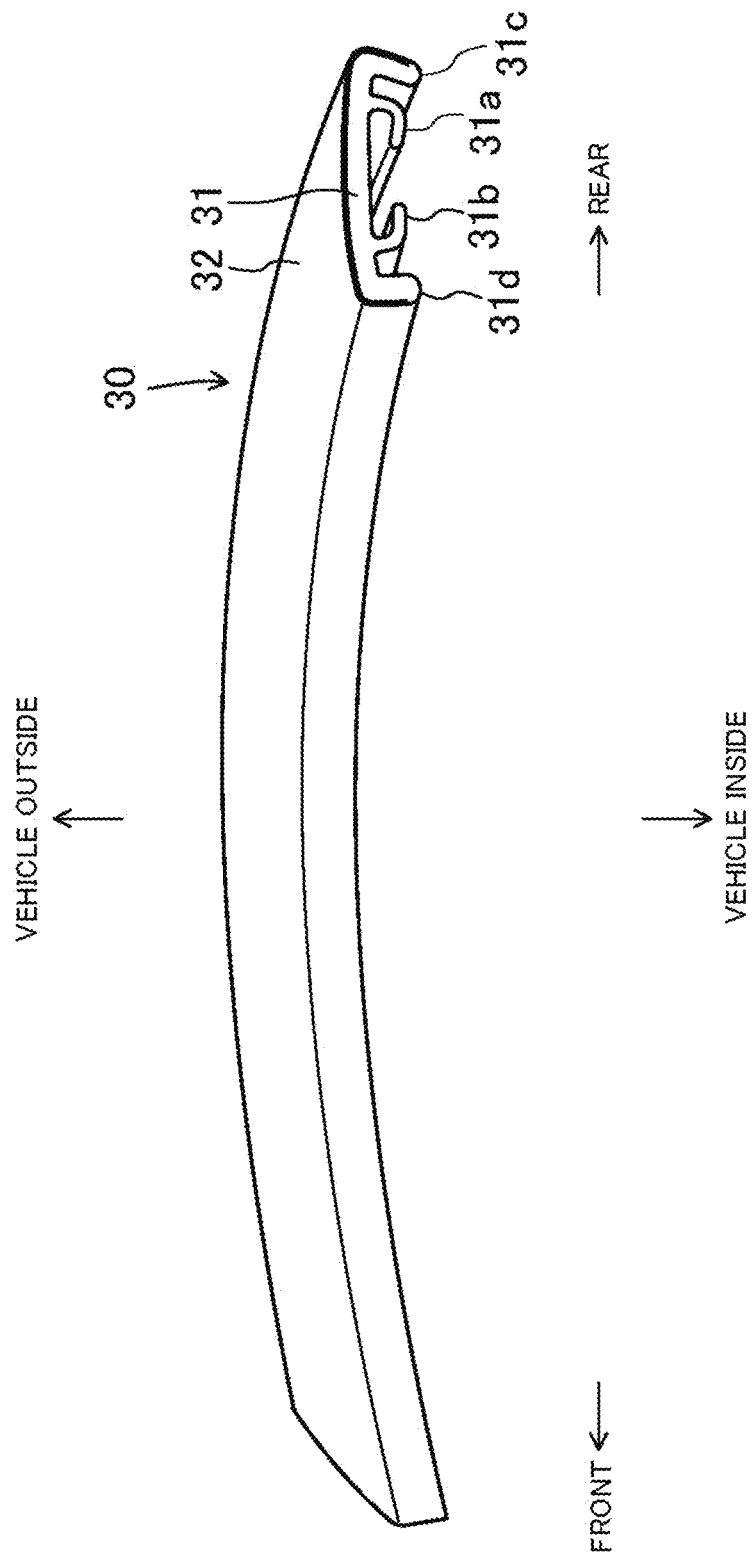
FIG. 5 is a diagram of the trim strip as viewed from the bottom.

As described above, since the window frame 3 is formed to be convex upward along the shape of the roof of the automobile, the glass run body 20 assembled to the window frame 3 is also curved to be convex upward. Thus, preferably, the trim strip 30 is also curved to be convex upward in conformity with the shape of the glass run body 20. Since the lower projection 31*d* is thicker than the upper projection 31*c* in the present embodiment, the resin of the lower projection 31*d* contracts more in the process of cooling the resin after extrusion molding. As a result, the trim strip 30 naturally curves to be convex upward, as illustrated in FIG. 4. The trim strip 30 is gently curved to be convex toward the vehicle outside, as well, as illustrated in FIG. 5. The shape of this curve toward the vehicle outside, too, is to conform to the shape of the glass run body 20 assembled to the window frame 3.

It is possible to change the shape of the curve of the trim strip 30 as viewed from a side by at least one of the thickness of the upper projection 31*c* or the thickness of the lower projection 31*d*. The greater the difference in thickness between the upper projection 31*c* and the lower projection 31*d* by reducing the thickness of the upper projection 31*c* and increasing the thickness of the lower projection 31*d*, the more tightly the trim strip 30 curves. On the contrary, the smaller the difference in thickness between the upper projection 31*c* and the lower projection 31*d*, the more gently the trim strip 30 curves.

The decorative tape 32 is coextruded on the side of the trim strip body 31 toward the vehicle outside. That is, the decorative tape 32 is extruded simultaneously with the extrusion of a resin material that forms the trim strip body 31 from an extrusion die of an extrusion molding machine, which allows the integration of the decorative tape 32 with the resin material forming the trim strip body 31, thus yielding a trim strip body 31 having the decorative tape 32. The decorative tape 32 is a decorative tape with metallic finish, having a metallic luster on its surface. The metallic finish herein refers to, for example, a stainless steel finish, an aluminum finish, a copper finish, or the like. However, the metallic finish is not limited to those, and any finish with a metallic luster is adoptable. For example, a black decorative tape may be adopted in another example. Such a decorative tape 32 has been well known, and for example, a decorative tape 32 having a metal plating layer and a protective layer as a front surface layer and a base layer as a back surface layer can be used. In this case, the back surface layer is made of a material having adhesive properties to the resin material forming the trim strip body 31. The decorative tape 32 is much thinner and lighter than a stainless steel plate or an aluminum plate used for known trim strips.

The upper portion of the decorative tape 32 extends to reach the upper surface of the upper projection 31*c* of the trim strip body 31. Thus, the upper surface of the upper projection 31c is covered by the upper portion of the decorative tape 32. The glass run body 20 has an upper contact portion 40, the tip of which comes into contact with the upper portion of the decorative tape 32 from above. Accordingly, the upper end of the decorative tape 32 is covered and hidden by the upper contact portion 40 and invisible from the outside, which improves the appearance.

Further, the lower portion of the decorative tape 32 extends to reach the lower surface of the lower projection 31d. Thus, the lower surface of the lower projection 31d is covered by the lower portion of the decorative tape 32. The glass run body 20 has a lower contact portion 41, the tip of which comes into contact with the lower portion of the decorative tape 32 from below. Accordingly, the lower end of the decorative tape 32 is covered and hidden by the lower contact portion 41 and invisible from the outside, which improves the appearance.

The trim strip body 31 is formed through extrusion molding in such a manner that the resin forming the trim strip body 31 does not overlap the upper end and the lower end of the surface of the decorative tape 32. Specifically, although the upper portion of the decorative tape 32 extends to reach the upper surface of the upper projection 31c, the trim strip body 31 is molded so that the resin forming the trim strip body 31 does not exist on the surface of the upper portion of the decorative tape 32. Further, although the lower portion of the decorative tape 32 extends to reach the lower surface of the lower projection 31d, the trim strip body 31 is molded so that the resin forming the trim strip body 31 does not exist on the surface of the lower portion of the decorative tape 32. This means that the trim strip body 31 is molded such that the entire surface of the decorative tape 32 is exposed from the resin forming the trim strip body 31. The moldability of the extrusion molding thus improves.

The trim strip 30 obtained through extrusion molding has a continuous elongated shape, and is longer than the dimension of the glass run body 20 in the front-rear direction. The elongated trim strip 30 is cut to fit the length of the glass run body 20 when it is attached to the glass run body 20. As illustrated in FIG. 4 and FIG. 5, the rear end of the trim strip 30 that has been cut is open, and the upper ridge 23b and the lower ridge 23c of the glass run body 20 are inserted from this open portion into the upper fit portion 31a and the lower fit portion 31b, respectively, for fitting. The trim strip 30 can be attached to a proper position by moving the trim strip 30 rearward with respect to the glass run body 20. The trim strip 30 can be attached from either the front or the rear.

Advantages of Embodiment

As described above, in the present embodiment, the trim strip 30 to be assembled to a side of the glass run body 20 closer to the vehicle outside includes the trim strip body 31 made of resin and formed through extrusion molding and a decorative tape 32 coextruded on a side of the trim strip body 31 closer to the vehicle outside. Use of the decorative tape 32 with a metallic finish makes it possible to obtain the trim strip 30 with a side toward the vehicle outside having a metallic finish without using a stainless steel plate or an aluminum plate. The resin forming the trim strip body 31 and the decorative tape 32 reduce the weight of the trim strip 30 because the resin forming the trim strip body 31 is lighter in weight than a stainless steel plate or an aluminum plate used as a material for known metal trim strip and because the decorative tape 32 is thinner than a stainless steel plate or an aluminum plate. Further, since the decorative tape 32 is coextruded at the time of extrusion molding of the trim strip body 31, the trim strip body 31 and the decorative tape 32 are already integrated when the trim strip 30 is manufactured. Thus, the number of parts does not increase. It is thus possible to provide a glass run 10 for automobile doors that is lightweight, has a small number of parts, and can reduce costs.

Further, since the thickness of the lower projection 31d of the trim strip body 31 is set to be thicker than the thickness of the upper projection 31c, the resin of the lower projection 31d contracts more in the process of cooling the resin after extrusion molding of the trim strip body 31. Accordingly, the trim strip 30 naturally curves to be convex upward into a shape in conformity with the shape of the glass run body 20. Thus, in assembling the trim strip 30 to the glass run body 20, less force is required in moving the trim strip 30 in the front-rear direction relative to the glass run body 20 while the upper fit portion 31a and the lower fit portion 31b of the trim strip body 31 are fitted to the upper ridge 23b and the lower ridge 23c of the glass run body 20, respectively. In short, the workability in assembling the trim strip 30 to the glass run body 20 is improved.

The above-described embodiments are merely illustrative in every respect and shall not be construed in a limited manner. All modifications and variations coming within the equivalency range of the appended claims are embraced within the scope of the present disclosure.

As described above, the present disclosure is applicable to a glass run disposed in a window frame of an automotive door.

DESCRIPTION OF REFERENCE CHARACTERS

1 Front Door
2 Door Body
2a Outer panel
3 Window Frame
3a Upper frame portion
3b Rear frame portion
3d Mirror-securing portion
4 Window Glass
5 Outer panel
6 Inner panel
7 Window opening
8 Glass-run attachment plate
8a Raised portion
11 Upper glass run portion
12 Front vertical glass run portion
13 Rear vertical glass run portion
20 Glass Run Body
10 Glass Run for Front Door (Glass Run for Automobile Door)
14 Insertion Groove
21 Upper plate portion
21a Upper engaging projections
22 Lower plate portion
22a Lower engaging projections
23 Outer plate portion
23a Projection
23b Upper Ridge
23c Lower Ridge
24 Upper sealing lip
25 Inner sealing lip
26 Inner sealing portion
27 Lower sealing portion
28 Lower sealing portion
29 Middle sealing lip 30 Trim Strip
31 Trim Strip Body
32 Decorative Tape
31a Upper Fit Portion
31b Lower Fit Portion
31c Upper Projection
31d Lower Projection
40 Upper contact portion
41 Lower contact portion
100 Vehicle body

What is claimed is:

1. A glass run for an automotive door, the glass run to be assembled to a window frame of the automotive door from vehicle outside and seal a gap between the window frame and window glass, the glass run comprising:
   a glass run body to be attached to a glass run attachment plate extending from an upper portion of the window frame toward the vehicle outside; and
   a trim strip to be assembled to a side of the glass run body closer to the vehicle outside, the trim strip extending in a vehicle front-rear direction, wherein
   an upper ridge projecting upward and extending in the vehicle front-rear direction and a lower ridge projecting downward and extending in the vehicle front-rear direction are formed at a portion of the glass run body where the trim strip body is attached,
   the trim strip includes a trim strip body made of resin and formed through extrusion molding, and a decorative tape coextruded on a side of the trim strip body closer to the vehicle outside,
   an upper projection and a lower projection, each projecting toward vehicle inside and extending in the vehicle front-rear direction, are formed on an upper end and a lower end of the trim strip body, respectively,
   an upper portion of the decorative tape extends to reach an upper surface of the upper projection,
   a lower portion of the decorative tape extends to reach a lower surface of the lower projection,
   an upper fit portion mating with the upper ridge and a lower fit portion mating with the lower ridge are formed on a side of the trim strip body closer to the vehicle inside,
   a thickness of the upper fit portion and a thickness of the lower fit portion are set to be thinner than a thickness of a portion of the trim strip body where the decorative tape is layered, and
   the trim strip is movable in the vehicle front-rear direction relative to the glass run body while the upper fit portion and the lower fit portion mate with the upper ridge and the lower ridge, respectively.

2. The glass run of claim 1, wherein
the glass run body is curved to be convex upward, and
a thickness of the lower projection is set to be thicker than a thickness of the upper projection.

3. The glass run of claim 1, wherein
the trim strip body is formed through extrusion molding in such a manner that the resin forming the trim strip body does not overlap an upper end and a lower end of a surface of the decorative tape.

4. The glass run of claim 1, wherein
a thickness of the lower projection is set to be thicker than a thickness of the upper projection and a thickness of a portion of the trim strip body extending in a vertical direction.

* * * * *